(12) United States Patent
Chen

(10) Patent No.: US 8,867,498 B2
(45) Date of Patent: Oct. 21, 2014

(54) DIRECTED BEACONING USING POLLING FOR DEVICES WITH DIFFERENT CAPABILITIES

(75) Inventor: Richard Chen, Croton-on-Hudson, NY (US)

(73) Assignee: Koninklijke Philips N.V., Eindhoven (NL)

(*) Notice: Subject to any disclaimer, the term of this patent is extended or adjusted under 35 U.S.C. 154(b) by 554 days.

(21) Appl. No.: 13/119,280

(22) PCT Filed: Sep. 3, 2009

(86) PCT No.: PCT/IB2009/053850
§ 371 (c)(1),
(2), (4) Date: Mar. 16, 2011

(87) PCT Pub. No.: WO2010/035158
PCT Pub. Date: Apr. 1, 2010

(65) Prior Publication Data
US 2011/0170523 A1    Jul. 14, 2011

Related U.S. Application Data

(60) Provisional application No. 61/099,919, filed on Sep. 25, 2008.

(51) Int. Cl.
H04J 3/00 (2006.01)
H04W 72/04 (2009.01)
H04W 74/06 (2009.01)

(52) U.S. Cl.
CPC .................................... H04W 74/06 (2013.01)
USPC ........... 370/336; 370/338; 370/328; 370/329; 370/466; 370/461; 455/450; 455/453; 455/455

(58) Field of Classification Search
CPC .................... H04W 72/0446; H04W 72/1263; H04W 72/085; H04W 74/04; H04W 74/06; H04W 74/08; H04W 88/182; H04W 88/085; H04W 88/04

USPC ......... 370/336, 338, 328, 329, 345, 461, 462, 370/466, 468; 455/450, 574, 95, 453, 455
See application file for complete search history.

(56) References Cited

U.S. PATENT DOCUMENTS

| | | | |
|---|---|---|---|
| 7,110,380 B2 * | 9/2006 | Shvodian | 370/336 |
| 2006/0198335 A1 * | 9/2006 | Reunamaki et al. | 370/328 |
| 2006/0215601 A1 | 9/2006 | Vleugels | |
| 2007/0183360 A1 * | 8/2007 | Arunan et al. | 370/328 |

FOREIGN PATENT DOCUMENTS

WO    WO2006087677 A1    8/2006
WO    WO2006092687 A1    9/2006

* cited by examiner

Primary Examiner — Jamal Javaid
(74) Attorney, Agent, or Firm — Larry Liberchuk

(57) ABSTRACT

A method and system for directed beaconing in a superframe structure (100, 310, 320, 330, 340) among devices of different types in a Wireless Personal Area Network (WPAN). A first type device directs a second type device to transmit beacons (345, 346) in a beacon group of first type devices, announcing the second type device's time slot reservations (314). The method includes: making a Distributed Reservation Protocol (DRP) reservation (314) of a time period in every superframe; selecting two consecutive beacon slots (325, 326) and indicating the two consecutive beacon slots (325, 326) as occupied; informing the second type device the timing of the two occupied consecutive beacon slots during the reserved time period (327); transmitting a response (338) in the reserved time period by the second type device; and transmitting two beacons (345, 346) by the second type device in the two occupied consecutive beacon slots.

15 Claims, 3 Drawing Sheets

DIRECTED BEACONING USING POLLING FOR DEVICES WITH DIFFERENT CAPABILITIES

This application claims the benefit of U.S. Provisional Application No. 61/099,919 filed on Sep. 25, 2008.

The invention generally relates to beaconing in a network and, more particularly, to a method and device for directed beaconing using polling for devices with different capabilities.

Developed by Ecma International, the ECMA-387 is a standard for a 60 GHz PHY (Physical layer) and MAC (Medium Access Control) for short range communications. The standard provides high rate WPAN (Wireless Personal Area Network) transport for both bulk rate transfer and multimedia streaming.

In the ECMA-387 specification, three types of devices with different capabilities are specified.

Type A device offers video streaming and WPAN applications in 10-meter range LOS/NLOS (Line-of-Sight/Non-Line-of Sight) multipath environments. It uses high gain trainable antennas. A Type A device is considered as a "high end"-high performance device.

Type B device offers video and data applications over shorter range (1-3 meters) point to point LOS links with non-trainable antennas. A Type B device is considered as an "economy" device and trades off range and NLOS performance in favor of low cost implementation and low power consumption.

Type C device supports data only applications over point to point LOS links at less than 1-meter range with non-trainable antennas and no QoS (Quality of Service) guaranties. A Type C device is considered as a "bottom end" device providing simpler implementation, lowest cost and lowest power consumption.

In the ECMA-387 MAC specification, a Distributed Reservation Protocol (DRP) is used for data transmission. All types of devices use a superframe structure. In a superframe structure, a periodic time interval, which contains a beacon period (BP) followed by a data period, is used to coordinate frame transmissions between devices. Devices can reserve time slots for data transmissions. As shown in FIG. 1, each superframe 100 starts with a beacon period, which has a maximum length of beacon slots (mMaxBPLength). The length of each beacon slot is specified by the beacon slot length (BeaconSlotLength). Beacon slots 101 in the BP are numbered in sequence, starting at zero. The first group (number=SignalSlotCount) beacon slots of a BP are referred to as signaling slots 102 and are used to extend the BP length of neighbor devices. FIG. 1 shows that some of the beacon slots are occupied by beacons sent by some devices (DEV 1, DEV 3, DEV 5, DEV 8 and DEV 9). In the DRP based data transmission, an active mode device transmits a beacon in the BP and listens for its neighbor's beacons in all beacon slots specified by its BP length in each superframe. When transmitting in a beacon slot, a device starts the transmission of the frame on the medium at the beginning of that beacon slot. A device transmits beacons at a beacon transmission rate (BeaconTransmitRate). Each type of device transmits its beacon using a PHY mode specific to its type. These beacons sent in a BP in a superframe structure are referred to as data beacons, since the purpose of these data beacons is to announce DRP for reservation based data transmission.

In order for the beacon protocol to work properly, beacon frames sent in a beacon period are transmitted in the same PHY mode. Therefore, if there are different types of devices, they need to be able to use a transmission mode that is common to the devices.

Type A devices transmit and receive their beacon frames using mode-A0; Type B devices transmit and receive their beacon frames using mode-B0; and Type C devices transmitted their beacons in mode-C0 mode. In addition, the beacon protocol itself might be too complex for low-end types of devices to carry out.

According to one embodiment of the present invention, a Type B device is directed to send its beacon in a beacon group of Type A devices with its reservation announced and therefore honored by the devices in the Type A beacon group.

Using this method, the Type B/C device avoids the entire complexity receiving mode-A0 transmission and carrying out beacon protocol. In addition, the reservation of the Type B/C device is honored by other devices in the Type A beacon group. Moreover, the method also provides time synchronization between the master and slave devices. The interoperability between different types of devices is accomplished using this method with little complexity.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
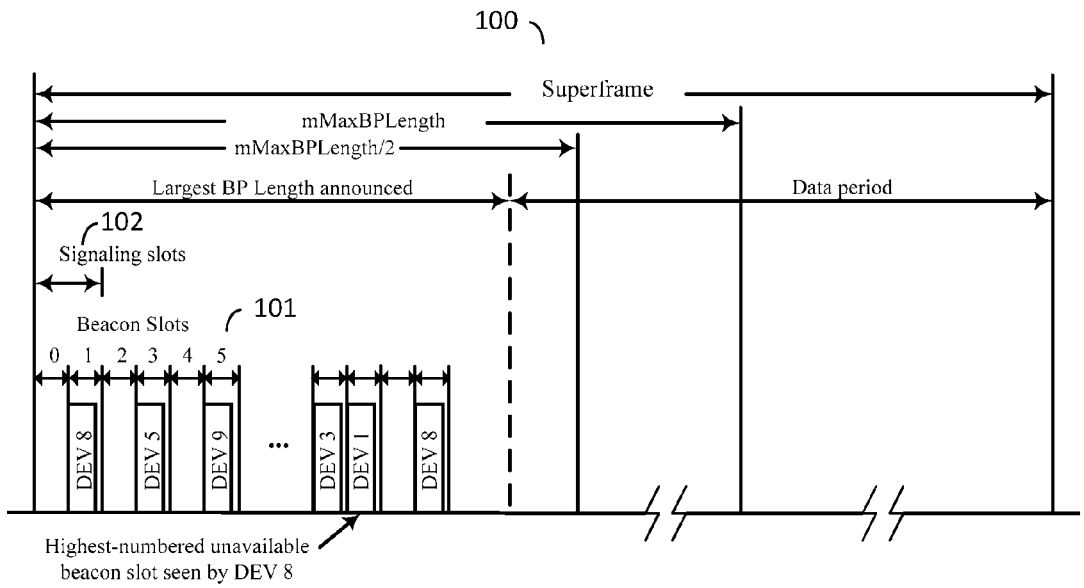
FIG. 1 illustrates an example of superframe structure of a Type A or B device.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Interoperability

In an embodiment of the present invention, interoperability between different types of devices is accomplished using a Master-Slave operation. In a Master-Slave operation, a first device acts as the master device (initiates polling) and a second device acts as a slave device (responds to a polling inquiry). The Master-Slave Pair (MSPr) selects a channel to exchange Physical layer Service Data Units (PSDUs) using an initial channel selection process before the master device starts the transmission of mode-A0 or mode-B0 beacons with the Status set to "Ready" in a channel. A Type B or Type C device that is operating in the slave mode derives all timing for communication with its master from the Poll frames transmitted by the master device.

There are three kinds of Master-Slave Pairs: Type A-B MSPr, Type A-C MSPr and Type B-C MSPr Type A-B MSPr According to one embodiment of the present invention, a Type B device is directed by a Type A device to send its beacon in a beacon group of Type A devices with its reservation announced and therefore honored by the devices in the beacon group. A beacon group consists of a set of devices from which a device receives beacons that identify the same beacon period start time (BPST) as the device.

Figure 3A:
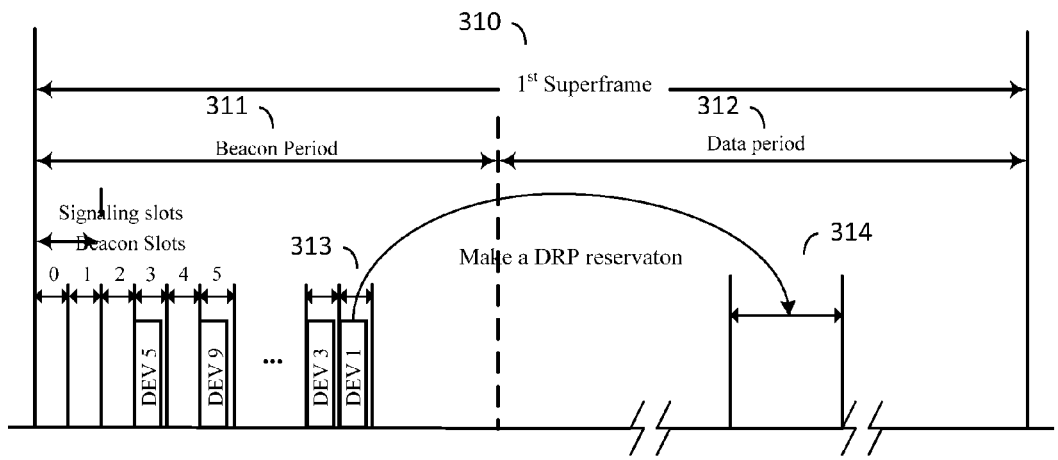
FIGS. 3A-3D illustrate a hand-shaking procedure for a Type A-B Master-Slave pair.
Figure 3B:
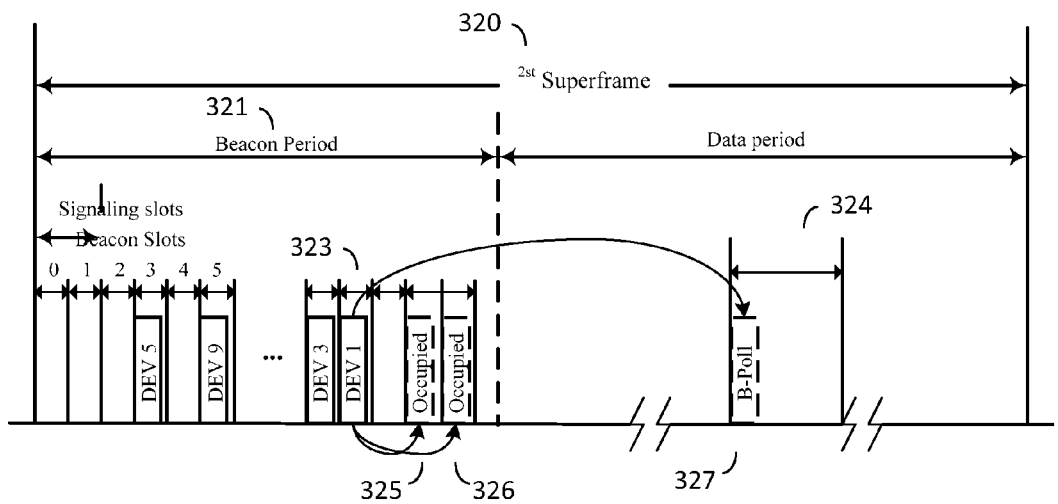

FIGS. 3A-3D illustrate the directed beaconing procedure. As shown in FIG. 3A, in the first superframe 310, a Type A master device (DEV 1) transmits mode-A0 beacons in a channel during the beacon period 311. By including DRP IEs (Information Elements) in its beacon 313, the Type A master device makes a DRP reservation of type "Private" to transmit B-Poll frames in every superframe. The period 314 within the data period 312 is reserved by the Type A device. As shown in FIG. 3B, in the second superframe 320, the Type A device transmits a beacon 323 and selects two consecutive beacon slots 325, 326 within the beacon period 321 for its Type B slave device to send its dual-beacon. The Type A device indicates the timing of the selected beacon slots in the B-Poll frame 327 it sends in the reserved period 324. In its beacon 323, the Type A device also indicates in its Beacon Period Occupancy Information Element (BPOIE) the two beacon slots 325, 326 selected for the Type B slave devices as occupied.

Figure 3C:
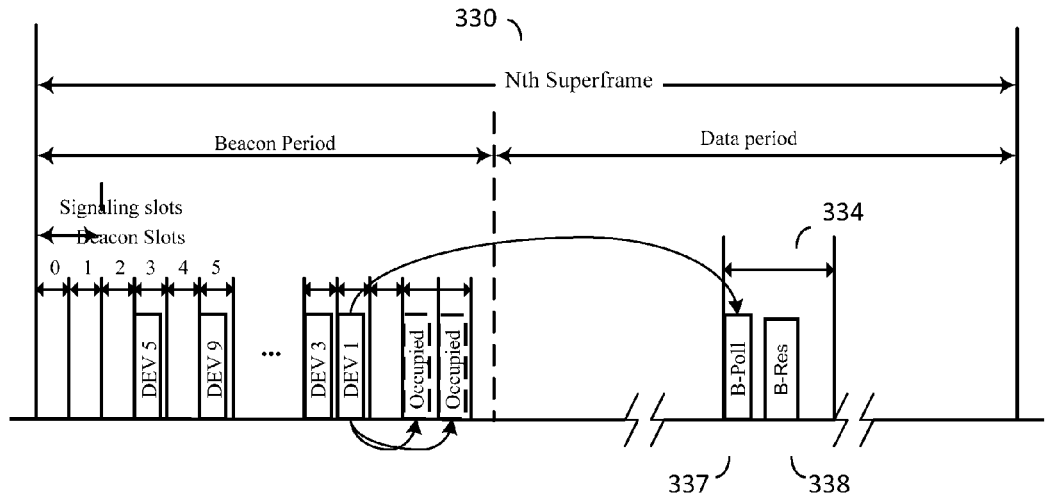
Figure 3D:
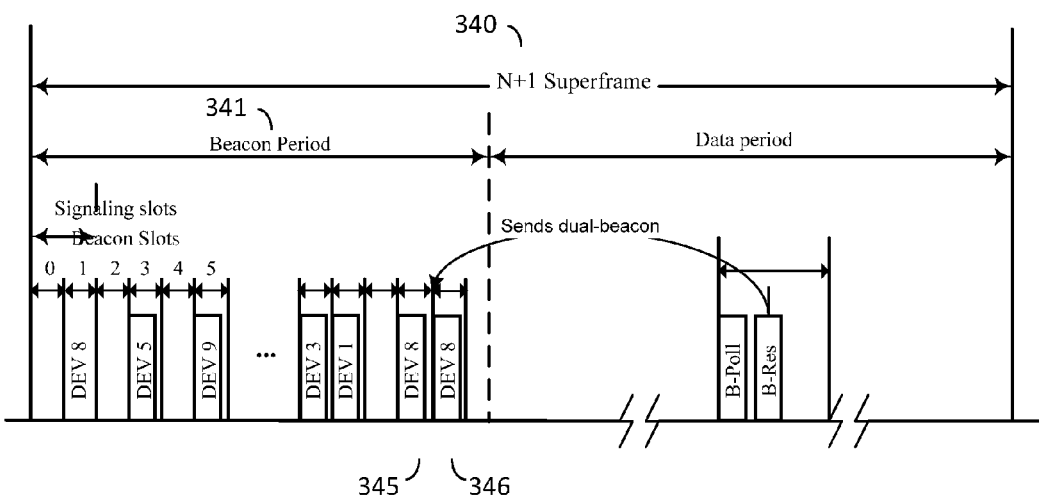

The Type B slave device does not transmit any frames after it switches to a selected channel to exchange MAC Protocol Data Unit (MPDU) with its master device until it receives a B-Poll frame from the Type A master device. As shown in FIG. 3C, after the Type B device receives the B-Poll frame, it transmits a response 338 during the reserved period 334 in the Nth superframe 330. The Type B device sends the B-Response frame for a time equal to the Short Inter-Frame Space (SIFS) after the reception of a B-Poll frame 337. As shown in FIG. 3D, the Type B device transmits a dual-beacon 345, 346 at the time indicated in the received B-Poll frame, during the beacon period 341 of the N+1 superframe 340. In the dual-beacon 345, 346, one of the two beacons is a mode-A0 beacon, and the other is a mode-B0 beacon.

The Type B device is directed to send its beacon in a beacon group of Type A devices with its reservation announced and therefore honored by the devices in the beacon group.

Type A-C MSPr and Type B-C MSPr

The Type A-C MSPr and Type B-C MSPr procedure are similar and will be discussed here together.

In a preferred embodiment of the invention, after starting the transmission of mode-A0 or mode-B0 beacons with Status set to "Ready" in a channel, the Type A or B master device makes a DRP reservation of type "Private" to transmit Type C Poll frames in the channel.

Figure 2:
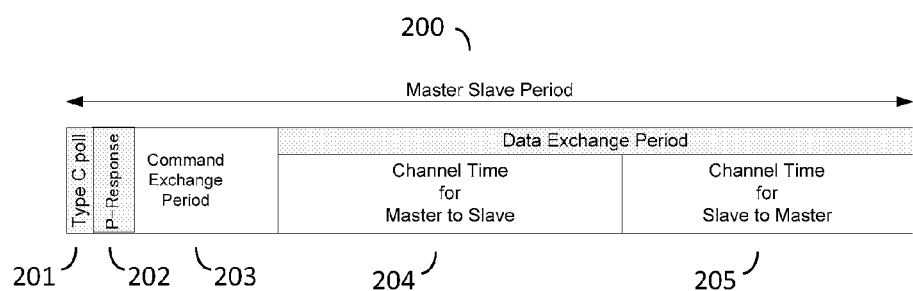
FIG. 2 illustrates an example of a Type C Master-Slave period.

The Type C device does not transmit any frames after it switches to a selected channel until it receives a Type C Poll frame from the master device. The Type C device follows the rules as illustrated in FIG. 2 to send Type C a response and exchange MPDUs with its master device. FIG. 2 shows a Master Slave Period 200 containing a Poll Frame Slot 201, Poll Response slot 202, Command Exchange Period 203, Data Exchange Period including a Channel Time for Master to Slave 204 and a Channel Time for Slave to Master 205. The Poll Frame Slot is used by a Master device to transmit the Type C Poll frame. The Poll Response Slot is used by a Slave device to acknowledge the reception of the Poll frame sent by its associated Master device. The Command Exchange Period is the period of time where Master device and Slave device may send command and data frames using a contention-based access mechanism. The Data Exchange Period is the period of time where Master device and Slave device may reserve time slots to send data without contention.

The hand-shaking procedure is similar to the one illustrated in the Type A-B MSPr section above, except that a Type C device does not send a dual-beacon in the beacon period of the beacon group. The Type C device follows the rules as illustrated in FIG. 2 to send Type C a response and exchange MPDUs with its master device, as discussed above.

The present invention can be used in wireless docking, wireless fast sync/downloading, wireless HDMI and wireless USB, for example.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for beaconing in a superframe structure among devices of different types, the method comprising:

reserving, by a first type device, beacon slots within a beacon period of the first device for transmission of beacons by a second type device in the reserved beacon slots, wherein each of the first type device and the second type device transmits beacons using a different physical (PHY) mode;

announcing, by the first type device, at least the second type device's beacon slot reservations in a superframe structure; and informing the second type device of a timing of the reserved beacon slots during a reserved time period in a data period of the superframe structure, such that the second type device is enabled to transmit beacons in two consecutive beacon slots of a beacon group of the first type device;

wherein the second type device is a type device different from the first type device in a Wireless Personal Area Network (WPAN).

2. The method of claim 1, wherein informing the second type device of the timing of the reserved beacon slots comprises:

making a Distributed Reservation Protocol (DRP) reservation of a time period in every superframe;

selecting the two consecutive beacon slots and indicating the two consecutive beacon slots as occupied;

transmitting a response to the first type device in the reserved time period by the second type device; and transmitting two beacons by the second type device in the two occupied consecutive beacon slots.

3. The method of claim 2, wherein the DRP reservation is made by a DRP Information Element of a first beacon transmitted by the first type device.

4. The method of claim 2, wherein indicating the two consecutive beacons slots as occupied is included in a Beacon Period Occupancy Information Element (BPOIE) of a beacon transmitted by the first type device.

5. The method of claim 2, wherein the second type device is informed of the timing of the two occupied consecutive beacon slots by a poll frame transmitted by the first type device.

6. The method of claim 2, wherein the second type device is a type device different from the first type device, based on type devices defined in ECMA-387 specification.

7. A communication system comprising:
- a first type device configured to transmit and receive beacon frames; and
- a second type device, different from the first type device, configured to transmit and receive beacon frames, wherein each of the first type device and the second type device transmits beacons using a different physical (PHY) mode, and wherein the first type device reserves beacon slots within a beacon period of the first device for transmission of beacons by the second type device in the reserved beacon slots,
- wherein the first type device is configured to announce at least the second type device's beacon slot reservations in a superframe structure, wherein the first type device is further configured to inform the second type device of a timing of the reserved beacon slots during a reserved time period in a data period of the superframe structure, such that the second type device is enabled to transmit beacons in two consecutive beacon slots of a beacon group of the first type device; and
- wherein the second type device is a type device different from the first type device in a Wireless Personal Area Network (WPAN).

8. The system of claim 7, wherein the first type device is further configured to:
- make a Distributed Reservation Protocol (DRP) reservation of a time period in every superframe;
- select the two consecutive beacon slots and indicate the two consecutive beacon slots as occupied; and
wherein the second type device is further configured to:
- transmit a response to the first type device in the reserved time period; and
- transmit two beacons in the two occupied consecutive beacon slots.

9. The system of claim 8, wherein the DRP reservation is made by a DRP Information Element of a first beacon transmitted by the first type device.

10. The system of claim 8, wherein the indication of the two consecutive beacons slots as occupied is included in a Beacon Period Occupancy Information Element (BPOIE) of a beacon transmitted by the first type device.

11. The system of claim 8, wherein the second type device is informed of the timing of the two occupied consecutive beacon slots by a poll frame transmitted by the first type device.

12. The system of claim 8, wherein the second type device is a type device different from the first type device, based on type devices defined in ECMA-387 specification.

13. A non-transitory computer readable medium having stored thereon computer executable code when executed causing a processor in a first device and a processor in a second device to perform a process of directed beaconing, the process comprising:
- reserving, by a first type device, beacon slots within a beacon period of the first device for transmission of beacons by a second type device in the reserved beacon slots, wherein each of the first type device and the second type device transmits beacons using a different physical (PHY) mode;
- announcing, by the first type device, at least the second type device's beacon slot reservations in a superframe structure; and
- informing the second type device of a timing of the reserved beacon slots during a reserved time period in a data period of the superframe structure, such that the second type device is enabled to transmit beacons in two consecutive beacon slots of a beacon group of the first type device;
- wherein the second type device is a type device different from the first type device in a Wireless Personal Area Network (WPAN).

14. The non-transitory computer readable medium of claim 13, further comprising:
- making a Distributed Reservation Protocol (DRP) reservation of a time period in every superframe;
- selecting the two consecutive beacon slots and indicating the two consecutive beacon slots as occupied;
- transmitting a response to the first type device in the reserved time period by the second type device; and
- transmitting two beacons by the second type device in the two occupied consecutive beacon slots.

15. The non-transitory computer readable medium of claim 14, wherein the DRP reservation is made by a DRP Information Element of a first beacon transmitted by the first type device.

* * * * *